United States Patent
Anantaraman et al.

(10) Patent No.: US 10,185,501 B2
(45) Date of Patent: Jan. 22, 2019

(54) METHOD AND APPARATUS FOR PINNING MEMORY PAGES IN A MULTI-LEVEL SYSTEM MEMORY

(71) Applicant: Intel Corporation, Santa Clara, CA (US)

(72) Inventors: Aravindh V. Anantaraman, Folsom, CA (US); Blaise Fanning, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 38 days.

(21) Appl. No.: 14/865,571

(22) Filed: Sep. 25, 2015

(65) Prior Publication Data

US 2017/0090780 A1    Mar. 30, 2017

(51) Int. Cl.
| | |
|---|---|
| *G06F 12/00* | (2006.01) |
| *G06F 3/06* | (2006.01) |
| *G06F 12/0802* | (2016.01) |
| *G06F 12/0804* | (2016.01) |
| *G06F 12/0866* | (2016.01) |
| *G06F 13/00* | (2006.01) |
| *G06F 13/28* | (2006.01) |

(52) U.S. Cl.
CPC .......... *G06F 3/0613* (2013.01); *G06F 3/0604* (2013.01); *G06F 3/0631* (2013.01); *G06F 3/0638* (2013.01); *G06F 3/0685* (2013.01); *G06F 12/0802* (2013.01); *G06F 12/0804* (2013.01); *G06F 12/0866* (2013.01); *G06F 2212/1021* (2013.01)

(58) Field of Classification Search
CPC .... G06F 3/0613; G06F 3/0604; G06F 3/0631; G06F 3/0638; G06F 12/0802; G06F 2212/1021

See application file for complete search history.

(56) References Cited

U.S. PATENT DOCUMENTS

| | | | |
|---|---|---|---|
| 5,912,839 A | 6/1999 | Ovshinsky et al. |
| 7,590,918 B2 | 9/2009 | Parkinson |
| 7,600,078 B1 | 10/2009 | Cen et al. |
| 7,756,053 B2 | 7/2010 | Thomas et al. |
| 7,913,147 B2 | 3/2011 | Swaminathan et al. |
| 8,051,253 B2 | 11/2011 | Okin et al. |
| 8,462,537 B2 | 6/2013 | Karpov et al. |
| 8,462,577 B2 | 6/2013 | Zeng et al. |
| 8,463,948 B1 | 6/2013 | Qawami et al. |
| 8,612,676 B2 | 6/2013 | Dahlen et al. |
| 8,605,531 B2 | 12/2013 | Kau et al. |
| 8,607,089 B2 | 12/2013 | Qawami et al. |
| 8,612,809 B2 | 12/2013 | Casper et al. |

(Continued)

OTHER PUBLICATIONS

Lee et al., "Architecting Phase Change Memory as a Scalable DRAM Alternative", ISCA '09, Jun. 20, 2009, 12 pgs., Austin, Texas, USA.

(Continued)

*Primary Examiner* — Mark A Giardino, Jr.
(74) *Attorney, Agent, or Firm* — Compass IP Law PC

(57) ABSTRACT

An apparatus is described. The apparatus includes a memory controller to interface with a multi-level system memory. The memory controller includes a pinning engine to pin a memory page into a first level of the system memory that is at a higher level than a second level of the system memory.

20 Claims, 9 Drawing Sheets

(56) References Cited

U.S. PATENT DOCUMENTS

| | | | |
|---|---|---|---|
| 8,649,212 | B2 | 2/2014 | Kau et al. |
| 8,838,935 | B2 | 9/2014 | Hinton |
| 9,195,589 | B2 | 11/2015 | Qawami et al. |
| 9,298,606 | B2 | 3/2016 | Ramanujan |
| 9,317,429 | B2 | 4/2016 | Ramanujan et al. |
| 9,342,453 | B2 | 5/2016 | Nale et al. |
| 9,378,133 | B2 | 6/2016 | Nachimuthu et al. |
| 9,378,142 | B2 * | 6/2016 | Ramanujan ........ G11C 14/0045 |
| 9,430,372 | B2 | 8/2016 | Nachimuthu et al. |
| 9,690,493 | B2 | 6/2017 | Dahlen et al. |
| 2002/0199075 | A1 | 12/2002 | Jacobs |
| 2004/0064672 | A1 * | 4/2004 | Fleming ............. G06F 12/1018 711/207 |
| 2007/0005922 | A1 | 1/2007 | Swaminathan et al. |
| 2007/0168607 | A1 | 7/2007 | Takai et al. |
| 2008/0016269 | A1 | 1/2008 | Chow et al. |
| 2008/0034148 | A1 | 2/2008 | Gower |
| 2008/0270811 | A1 | 10/2008 | Chow et al. |
| 2009/0313416 | A1 | 12/2009 | Nation |
| 2010/0110748 | A1 | 5/2010 | Best |
| 2010/0131827 | A1 | 5/2010 | Sokolov |
| 2010/0291867 | A1 | 11/2010 | Abdulla et al. |
| 2010/0293317 | A1 | 11/2010 | Confalonieri et al. |
| 2010/0306446 | A1 | 12/2010 | Villa et al. |
| 2010/0306453 | A1 | 12/2010 | Doller |
| 2010/0318718 | A1 | 12/2010 | Eilert et al. |
| 2011/0153916 | A1 | 6/2011 | Chinnaswamy et al. |
| 2011/0208900 | A1 | 8/2011 | Schuette et al. |
| 2011/0291884 | A1 | 12/2011 | Oh et al. |
| 2013/0268728 | A1 | 10/2013 | Ramanujan et al. |
| 2013/0275661 | A1 | 10/2013 | Zimmer et al. |
| 2013/0290597 | A1 | 10/2013 | Faber |
| 2014/0129767 | A1 | 5/2014 | Ramanujan et al. |
| 2014/0164545 | A1 | 6/2014 | Davis et al. |
| 2014/0201471 | A1 | 7/2014 | Cutter et al. |
| 2014/0297938 | A1 | 10/2014 | Puthiyedath et al. |
| 2015/0169439 | A1 | 6/2015 | Torrant et al. |
| 2015/0227469 | A1 | 8/2015 | Zyulkyarov et al. |

OTHER PUBLICATIONS

Condit et al., "Better I/O Through Byte-Addressable, Persistent Memory", SOSP '09, Oct. 11, 2009, pp. 133-146. Big Sky, Montana, USA.

Freitas et al., "Storage-class memory: The next storage system technology", IBM J. Res. & Dev., Jul./Sep. 2008, pp. 439-447, vol. 52, No. 4/5.

Akel et al., "Onyx: A Prototype Phase Change Memory Storage Array",www.flashmemorysummit.com/.../Proceeding_2011/08/11_S301_Akel.pdf, 5 pgs.

Mearian, "IBM announces computer memory breakthrough Phase-change memory offers 100 times the write performance of NAND flash", Jun. 30, 2011, 3 pgs.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

"Phase change memory-based 'moneta' system points to the future of computer storage", ScienceBlog, Jun. 2, 2011, 7 pgs.

Quereshi et al., "Scalable High Performance Main Memory System Using Phase-Change Memory Technology", ISCA '09, Jun. 20, 2009, 10 pgs., Austin, Texas, USA.

Kant, Dr. Krishna, "Exploiting NVRAM for Building Multi-Level Memory Systems", International Workshop on Operating System Technologies for Large Scale NVRAM, Oct. 21, 2008, Jeju, Korea, 19 pages.

Bailey et al., "Operating System Implications of Fast, Cheap, Non-Volatile Memory" 13th Usenix, HOTOS11 2011, May 9-11, 2011, 5 pgs.

Raoux et al., "Phase-change random access memory: A scalable technology", IBM J. Res. & Dev., Jul./Sep. 2008, pp. 465-479, vol. 52, No. 4/5.

Chen et al., "Rethinking Database Algorithms for Phase Change Memory", 5th Biennial Conference on Innovative Data Systems Research (CIDR '11), Jan. 9, 2011, 11 pgs., Asilomar, California, USA.

Jacob et al., "The Memory System You Can't Avoid It, You Can't Ignore It, You Can't Fake It", 2009, 77 pgs., Morgan & Claypool.

Mogul et al., "Operating System Support for NVM+DRAM Hybrid Main Memory", 12th Workshop on Hot Topics in Operating Systems (HatOS XII), May 18, 2009, 9 pgs.

Wu, et al., "eNVy: A Non-Volatile, Main Memory Storage System" 1994 ACM., ASPLOS VI. pp. 86-97.

Dhiman, et al. "PDRAM: A Hybrid PRAM and DRAM Main Memory System", Jul. 26, 2009, Department of Computer Science and Engineering, 6 pages.

Notification of the Transmittal of the International Search Report and The Written Opinion of the International Searching Authority, from related PCT/US2016/044782, dated Dec. 1, 2016, 14 pages.

* cited by examiner

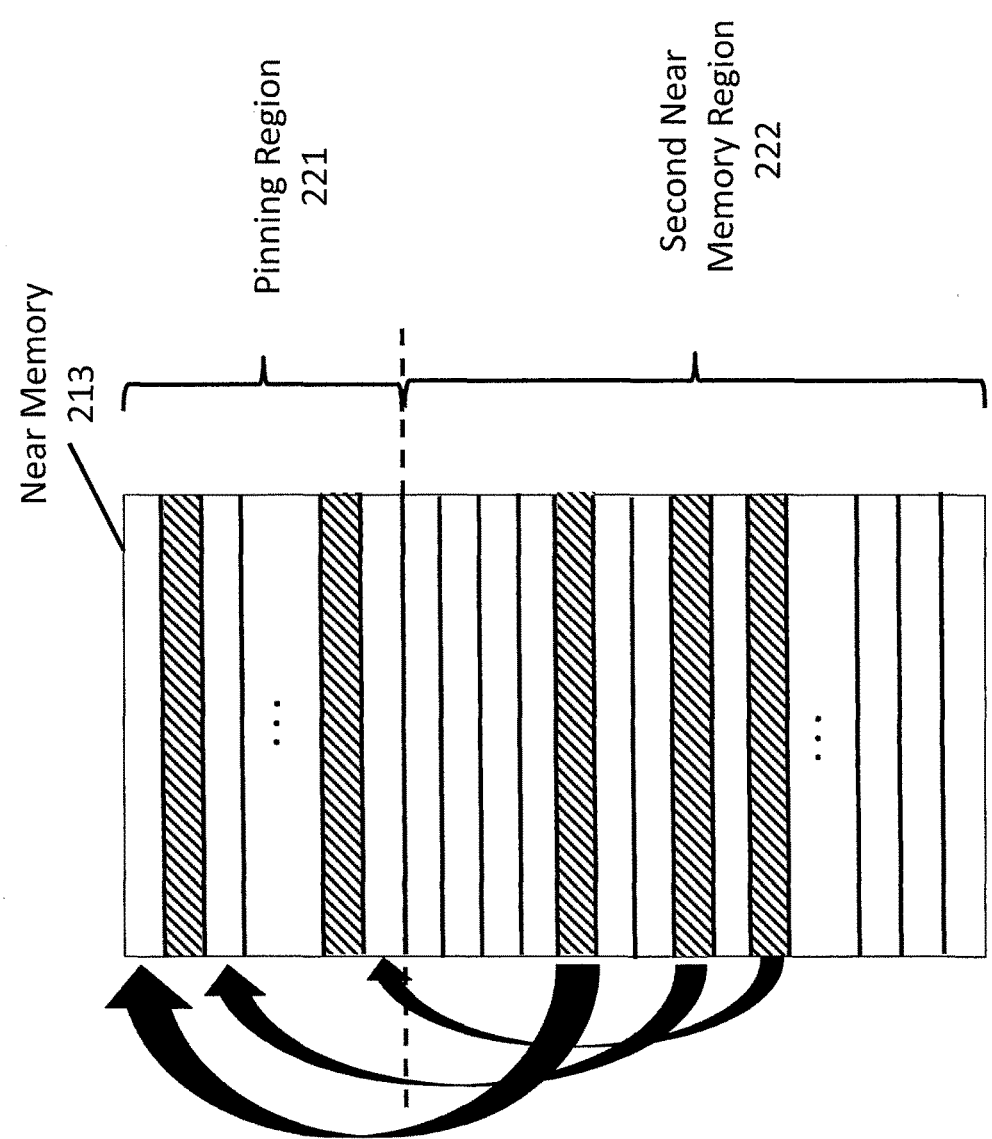

METHOD AND APPARATUS FOR PINNING MEMORY PAGES IN A MULTI-LEVEL SYSTEM MEMORY

FIELD OF INVENTION

The field of invention pertains generally to computing systems, and, more specifically, to a method and apparatus for pinning memory pages in a multi-level system memory.

BACKGROUND

Computing systems typically include system memory (or main memory) that contains data and program code of the software code that the system's processor(s) are currently executing. A pertinent bottleneck in many computer systems is the system memory. Here, as is understood in the art, a computing system operates by executing program code stored in system memory. The program code when executed reads and writes data from/to system memory. As such, system memory is heavily utilized with many program code and data reads as well as many data writes over the course of the computing system's operation. Finding ways to speed-up system memory is therefore a motivation of computing system engineers.

FIGURES

A better understanding of the present invention can be obtained from the following detailed description in conjunction with the following drawings, in which:

FIGS. 2a through 2e show various scenarios associated with pinning of memory pages in a level of a multi-level system memory;

DETAILED DESCRIPTION

Figure 1:
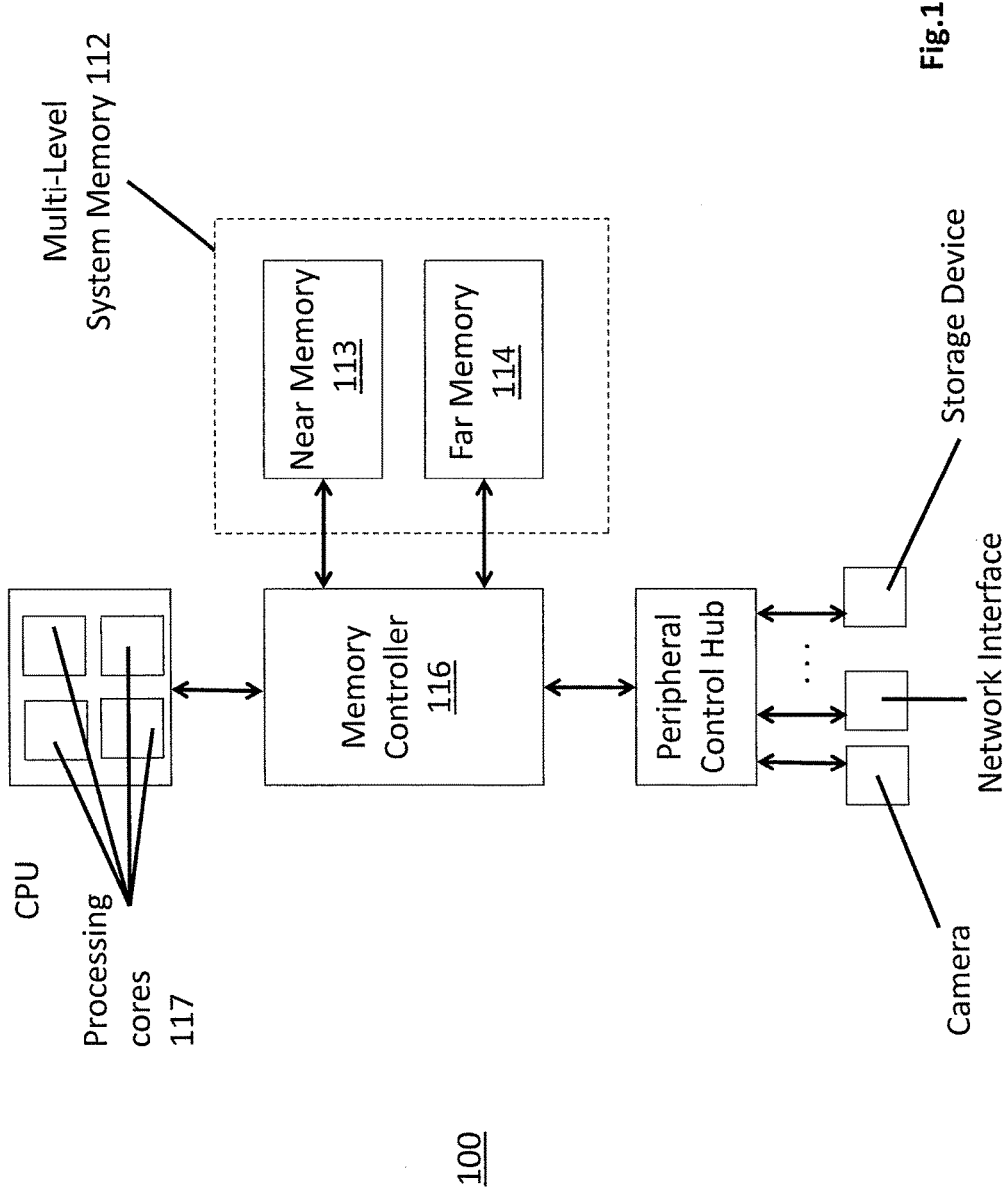
FIG. 1 shows a computing system having a multi-level system memory.

One of the ways to speed-up system memory without significantly increasing power consumption is to have a multi-level system memory. FIG. 1 shows an embodiment of a computing system 100 having a multi-tiered or multi-level system memory 112. According to various embodiments, a faster near memory 113 may be utilized as a memory side cache, or, a higher priority region of system memory.

In the case where near memory 113 is used as a memory side cache, near memory 113 is used to store data items that are expected to be more frequently called upon by the computing system. The near memory cache 113 has lower access times than the lower tiered far memory 114 region. By storing the more frequently called upon items in near memory 113, the system memory will be observed as faster because the system will often read items that are being stored in faster near memory 113.

According to some embodiments, for example, the near memory 113 exhibits reduced access times by having a faster clock speed than the far memory 114. Here, the near memory 113 may be a faster, volatile system memory technology (e.g., high performance dynamic random access memory (DRAM)). By contrast, far memory 114 may be either a volatile memory technology implemented with a slower clock speed (e.g., a DRAM component that receives a slower clock) or, e.g., a non volatile memory technology that is inherently slower than volatile/DRAM memory.

For example, far memory 114 may be comprised of an emerging non volatile byte addressable random access memory technology such as, to name a few possibilities, a phase change based memory, a ferro-electric based memory (e.g., FRAM), a magnetic based memory (e.g., MRAM), a spin transfer torque based memory (e.g., STT-RAM), a resistor based memory (e.g., ReRAM) or a Memristor based memory, universal memory, Ge2Sb2Te5 memory, programmable metallization cell memory, amorphous cell memory, Ovshinsky memory, dielectric memory, etc.

Such emerging non volatile random access memories technologies typically have some combination of the following: 1) higher storage densities than DRAM (e.g., by being constructed in three-dimensional (3D) circuit structures (e.g., a crosspoint 3D circuit structure); 2) lower power consumption densities than DRAM (e.g., because they do not need refreshing); and/or 3) access latency that is slower than DRAM yet still faster than traditional non-volatile memory technologies such as FLASH. The later characteristic in particular permits an emerging non volatile memory technology to be used in a main system memory role rather than a traditional storage role (which is the traditional architectural location of non volatile storage).

Regardless of whether far memory 114 is composed of a volatile or non volatile memory technology, in various embodiments far memory 114 acts as a true system memory in that it supports finer grained data accesses (e.g., cache lines) rather than larger blocked based accesses associated with traditional, non volatile storage (e.g., solid state drive (SSD), hard disk drive (HDD)), and/or, otherwise acts as an (e.g., byte) addressable memory that the program code being executed by processor(s) of the CPU operate out of.

Because near memory 113 acts as a cache, near memory 113 may not have its own individual addressing space. Rather, far memory 114 includes the individually addressable memory space of the computing system's main memory. In various embodiments near memory 113 truly acts as a cache for far memory 114 rather than acting a last level CPU cache. Generally, a CPU level cache is able to keep cache lines across the entirety of system memory addressing space that is made available to the processing cores 117 that are integrated on a same semiconductor chip as the memory controller 116.

For example, in various embodiments, system memory is implemented with dual in-line memory module (DIMM) cards where a single DIMM card has both DRAM and (e.g., emerging) non volatile memory chips disposed in it. The DRAM chips effectively act as an on board cache for the non volatile memory chips on the DIMM card. Ideally, the more frequently accessed cache lines of any particular DIMM card will be found on that DIMM card's DRAM chips rather than its non volatile memory chips. Given that multiple DIMM cards are typically plugged into a working computing system and each DIMM card is only given a section of the system memory addresses made available to the processing cores 117 of the semiconductor chip that the DIMM cards are coupled to, the DRAM chips are acting as a cache for the non volatile memory that they share a DIMM card with rather than a last level CPU cache.

In other configurations DIMM cards having only DRAM chips may be plugged into a same system memory channel (e.g., a DDR channel) with DIMM cards having only non volatile system memory chips. Ideally, the more frequently used cache lines of the channel will be found in the DRAM DIMM cards rather than the non volatile memory DIMM cards. Thus, again, because there are typically multiple memory channels coupled to a same semiconductor chip having multiple processing cores, the DRAM chips are acting as a cache for the non volatile memory chips that they share a same channel with rather than as a last level CPU cache. Although the above example referred to packaging solutions that included DIMM cards, it is pertinent to note that this is just one example and other embodiments may use other packaging solutions (e.g., stacked chip technology, one or more DRAM and phase change memories integrated on a same semiconductor die or at least within a same package as the processing core(s), etc.).

In still yet other embodiments, near memory 113 does not act as a cache for far memory 114 and instead is allocated its own unique system memory address space. In this approach, near memory 113 acts as a higher priority, faster level of system memory than far memory 114. Thus, for instance, higher priority or higher performance applications are configured to run out of address space allocated to near memory 113 rather than far memory 114. In still yet other embodiments, some portion of near memory 113 is configured to act as a memory side cache for far memory 114 and another portion of near memory 113 is configured as higher priority system memory allocated with its own system memory addressing space.

In yet other embodiments, near memory 113 may act as a CPU level cache.

Another use of near memory 113 is pinning. In the case of pinning, a hardware or software component of the computing system issues a request to use faster near memory 113. For example, a graphics processing unit of the computing system may request to use near memory 113 to speed up its graphics processing performance. A pinning engine within the memory controller of the multi-level system memory receives the request and allocates space in near memory 113 for the requesting component.

In an implementation, the requesting component requests pinning on a memory page by memory page basis (e.g., a first pinning request is issued for a first memory page, a second pinning request is issued for a second memory page, etc.). Upon a favorable response by the pinning engine, a memory page that was the subject of the request is kept in near memory 113 and the requesting component experiences a performance boost by operating from the memory page while it is kept in faster near memory 113.

Here, some portion of near memory 113 is reserved for pinning to satisfy the various pinning requests from the various computing system components while other portion (s) of near memory are used to implement, e.g., a memory side cache and/or a higher priority system memory level as described above.

Figure 2A:
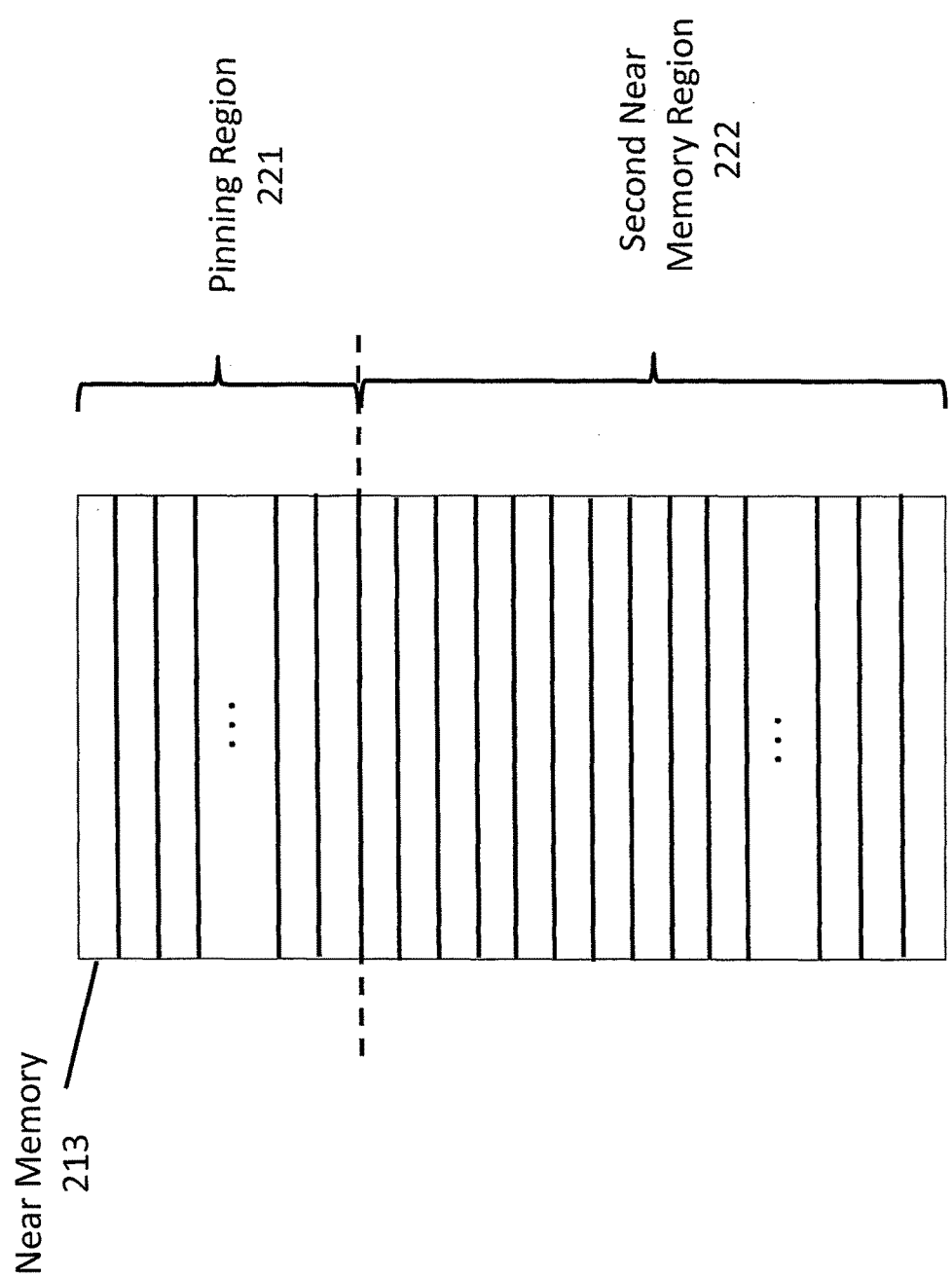
Figure 2B:
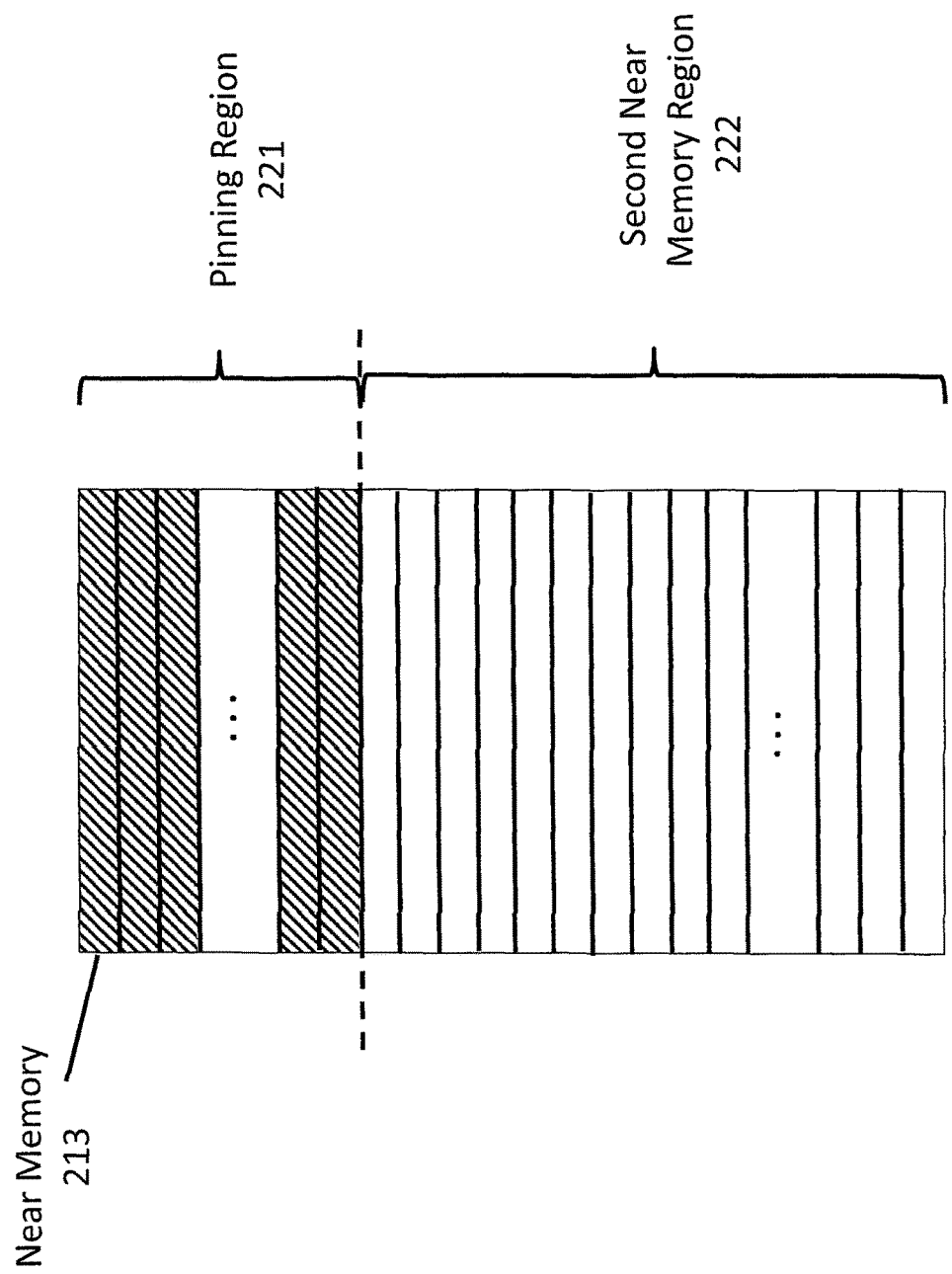
Figure 2C:
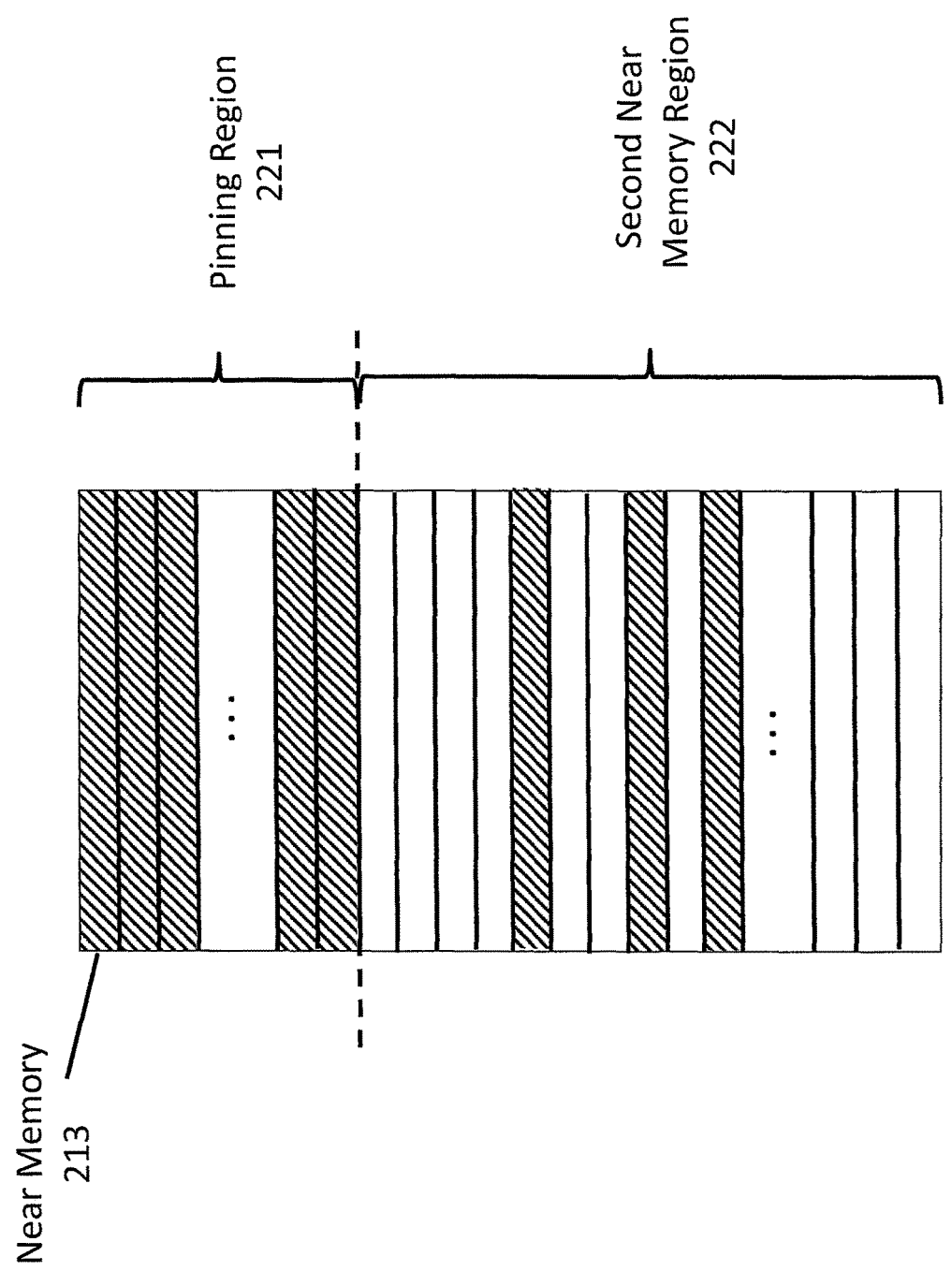
Figure 2D:
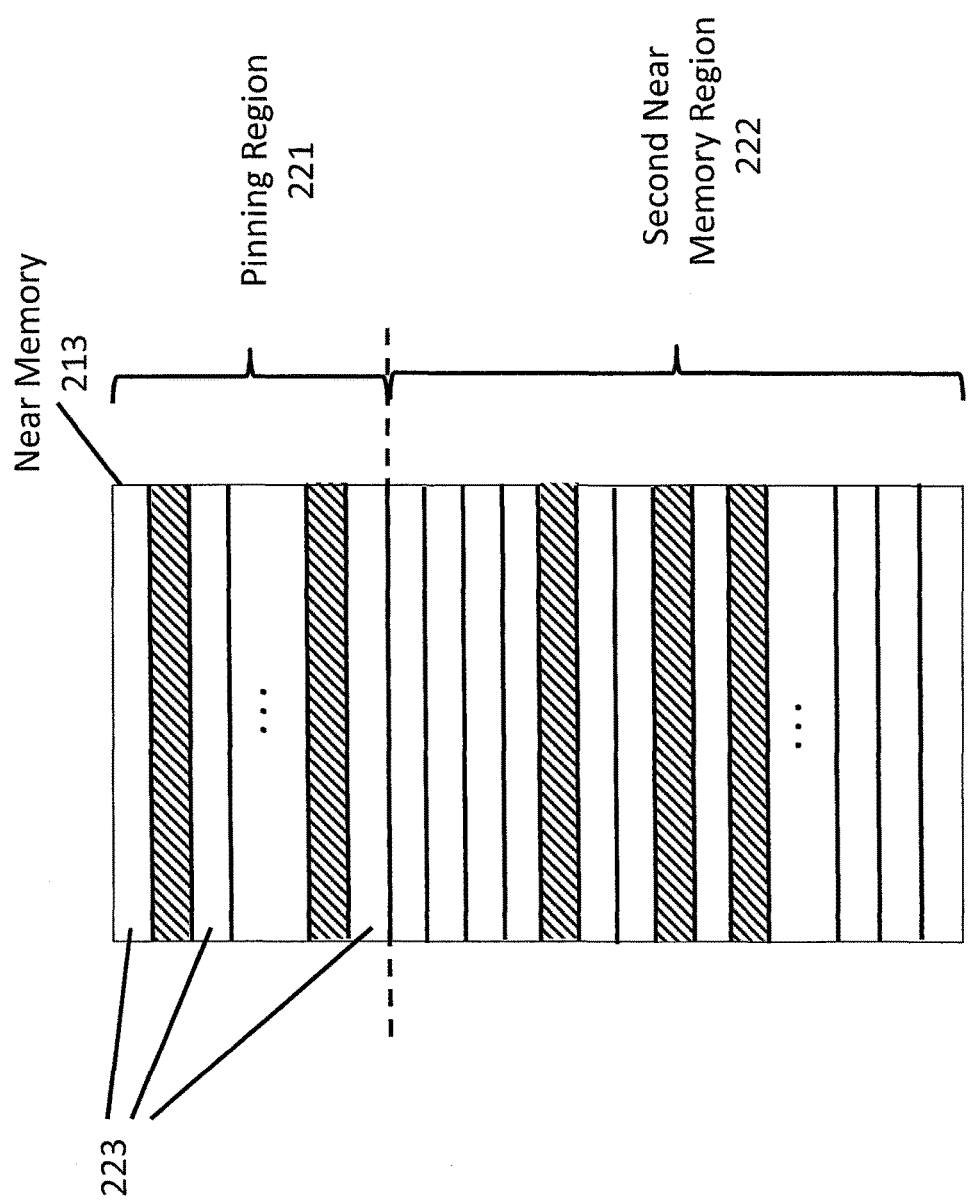

FIG. 2a shows a simple depiction of the arrangement where a first group of memory page address slots 221 within near memory 213 are allocated for pinning purposes while the remaining memory page address slots 222 are allocated for other near memory uses (e.g., memory side cache and/or higher priority system memory). Inefficient usage of near memory 213 may result in scenarios where there is heavy demand for pinning followed by a diminished pinning demand. Specifically, near memory can be fragmented so that otherwise available memory page address slots within the pinning region 221 go unused and memory page address slots within the "second" region 222 are not available for their standard usage. FIGS. 2b, 2c and 2d and their corresponding discussion describe the fragmentation problem in more detail immediately below.

FIG. 2b shows a situation where the pinning region 221 is being used to maximum capacity. Here, one or more components of the computing system have requested a number of memory pages to be pinned equal to the number of memory page address slots 221 allocated in near memory 213 for pinning purposes (the shaded memory page address slots correspond to slots that are currently keeping a pinned memory page). From the situation in FIG. 2b it is possible that even more pinning requests will be received by the memory controller's pinning engine.

As observed in FIG. 2c, some or all of these additional pinning requests may be granted by allocating additional memory page address slots within the second usage region 222 for pinning. Here, e.g., because pinning may be seen, at least for some requests, as a higher priority need than the second usage of near memory, second region near memory address slots are no longer used for their second near memory usage but are instead re-allocated to keep pinned memory pages.

FIG. 2c depicts this scenario by showing not only the pinning region 221 being completely used for pinning but also various memory page address slots within the second region 222 being used for pinning as well. Notably, the allocation of the second region 222 for pinning reduces the performance of the second region 222 for its second purpose. For example, if the second region 222 is used as a memory side cache, the size of the memory side cache is increasingly reduced as more address slots of the second region 222 are used for pinning.

The protocol used by the pinning engine in deciding whether or not to satisfy a pinning request when the pinning region 221 is already fully consumed may vary from embodiment. According to one embodiment, pinning requests are simply assumed to be higher priority than all other near memory uses and are therefore automatically granted even if the pinning region 221 is full. In yet other approaches some degree of discretion may be designed into the pinning engine. For example, for certain higher priority or higher performance system components (e.g., a GPU) pinning requests are automatically granted even if the pinning region 221 is full while for other lower priority or lower performance system components (e.g., a peripheral storage device) pinning requests are automatically denied if the pinning region 221 is full. In yet other embodiments, the pinning engine may ask an operating system instance or virtual machine monitor for guidance on resolving the request.

FIG. 2d shows a follow on situation from the situation in FIG. 2c in which a number of memory pages that were pinned in the pinning region 221 are now no longer pinned. Here, the original requestor(s) for these pinning regions may no longer need the performance boost from pinning and have explicitly informed the pinning engine of the same. In response, the pinning engine has evicted the pages from the pinning region 221 to a lower system memory level.

As such, there are now openings 223 in the pinning region 221 that are not being used for pinning while, at the same time, there are pinned memory pages that are still be used from the second region 222. Thus, in the situation of FIG. 2d, the performance of both the pinning region 221 and the second region 222 are operating in a reduced state even though, e.g., the number of address slots consumed by a pinned memory page is equal to the number of address slots allocated for pinning within the pinning region 221.

FIG. 2e shows a solution to the problem of FIG. 2d. As observed in FIG. 2e, the computing system is able to recognize the fragmentation situation of FIG. 2d and, in response, physically migrate the pinned memory pages within the second region 222 to the pinning region 221. By so doing, both the pinning and second regions 221, 222 operate at or closer to their full potential because there are fewer unused locations in the pinning region 221 (hence the pinning region 221 is operating closer to its maximum potential) and there are fewer locations in the second region being used for pinning (hence the second region effectively expands its role as, e.g. a near memory cache or a higher priority system memory).

Figure 3:
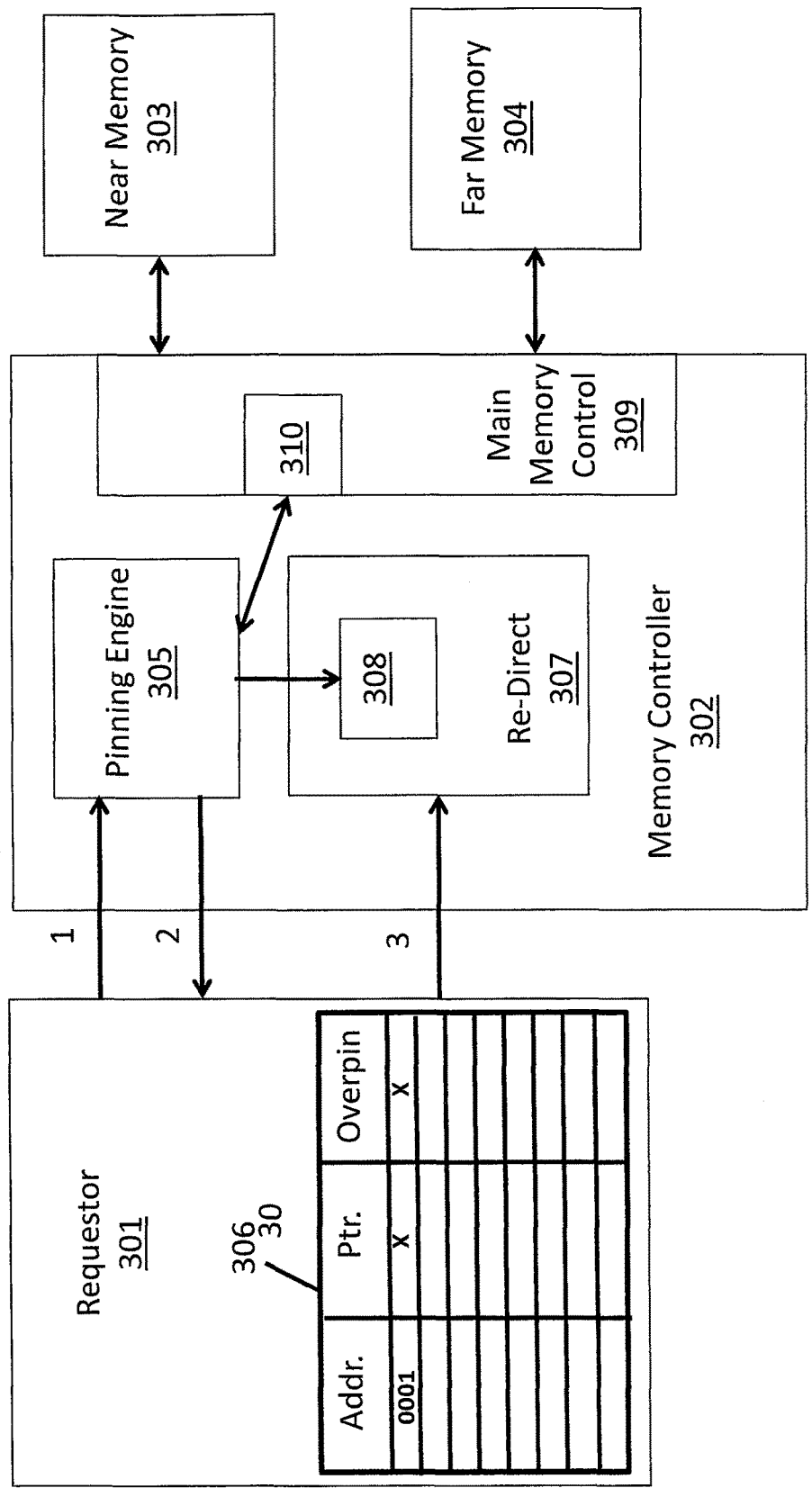
FIG. 3 shows a memory controller with a pinning engine to manage pinning of memory pages in a level of a multi-level system memory.

FIG. 3 shows a high level architectural diagram of a computing system that can operate as described above with respect to FIGS. 2a through 2e. FIG. 3 depicts a requestor 301 and a memory controller 302 that interfaces with a multi-level system memory including a near memory 303 and a far memory 304. The memory controller 302 includes a pinning engine 305 for pinning memory pages into a pinning region of near memory 303. The requestor 301 can be implemented with software (e.g., an application, an operating system (OS) instance, a virtual machine monitor, firmware), hardware (e.g., logic circuitry disposed on a semiconductor chip that makes specific invocations to memory such as a graphics processor unit (GPU), an I/O control hub, etc.) or a combination of the two.

In an embodiment, the requestor 301 sends a pin request 1 to the pinning engine 305 to pin a specific memory page that the requestor 301 operates out of (the specific memory page is identified in the request by its system memory address). Other types of requests include un-pin and re-pin. An un-pin request is used when the requester 301 no longer recognizes the need to pin a specific memory page and specifically informs the pinning engine 301 that the specific memory page can be removed from its pinned status (the specific memory page is identified in the un-pin request 1 by its system memory address). A re-pin request 1 is sent by the requestor 301 to identify to the pinning engine 305 a memory page that is being pinned in the second region 222 of near memory 303 that the requester 301 believes may be able to migrated over to the pinning region 221 (again the specific memory page is identified in the re-pin request by its system memory address). Each of the different types of requests and the system responses thereto are described in more detail immediately below.

In the case of a pin request, an instance of the memory page is being kept in some other region of system memory (e.g., far memory 304) at the time the pin request 1 is made. In an embodiment, a response 2 to a pin request includes various fields of information and the requestor 301 maintains a table 306 that keeps track of these fields for the specific memory page that the pin request was sent on behalf of.

Specifically, in an embodiment, a response 2 to a pin request may indicate whether the pin request has been approved (Y/N). The response 2 includes the address of the page so that the requester 301 can determine which memory page the response 2 pertains to.

Another field of information in the response 2, if the response 2 indicates that the earlier pinning request has been granted, whether the memory page is being pinned in the pinning region 221 or the second region 222. If the response 2 indicates that the memory page is being pinned in the second region 222, the requestor 301 sets a bit in the overpin column of table 306 for the memory page's entry so the requestor 301 can recognize that the particular memory page is not being kept in the pinning region 221 and is instead being pinned in the second region 222. Also, in an embodiment, any response 2 that indicates the page is being pinned in the second region 222 additionally provides a pointer that the requestor keeps in the Ptr. column of the memory page's entry in table 306 along with the set overpin bit. By contrast, a response that indicates the page is being pinned in the pinning region 221 does not include any pointer.

Here, in an embodiment, subsequent memory access requests 3 to the memory controller 302 for data from pages pinned in the pinning region 221 do not include a pointer but access requests 3 to the memory controller 302 for data on pages pinned in the second region 222 include a pointer. The presence or lack of presence of a pointer in a memory access request 3 informs re-direct logic 307 within the memory controller 302 whether to look for a pinned memory page in the pinning region 221 of near memory 303 or within the second region 222 of near memory 303.

In the basic case where a targeted memory page is pinned in the pinning region 221, as part of responding to the request to pin the memory page, the pinning engine 305 updates a table 308 in the re-direct logic 307 that maps the system memory address of the page to a specific page address slot within the pinning region 221 of near memory 303. In an embodiment, as part of the standard processing of any/all memory access requests 3 received by the memory controller 302, the memory controller 302 scans this table 308 for an address match. If the address of the memory access request matches an entry in table 308, the memory controller 303 uses the mapped to address slot from the table 308 to access the memory page from the pinning region 221 of near memory 303.

By contrast, in an embodiment, in the case where the memory page is pinned in the second region 222, the pinning engine 305 does not update table 308 and instead includes a pointer in the response 2 to the address slot in the second region 222 where the memory page is being pinned. The response 2 also indicates that the page is being pinned in the second region 222 and not in the pinning region 221. As mentioned above, the requestor 301 records this information in table 306.

Thus when the requestor 301 seeks to make a memory access request 3 for one of its pinned pages, it first looks to table 306. If the entry for the page in table 306 does not include a pointer (and therefore also does not indicate that the page is being kept in the second region 222), the requestor 301 simply issues a standard memory access request 3 to the memory controller 302. The memory controller 302, in turn, scans table 308, identifies an address match and re-directs to the pinning region 221 of near memory 303 for the page. By contrast, if the entry for the page in table 306 includes a pointer and indicates that the page is being kept in the second region 222, the memory access request 3 for the page that is issued to the memory controller 302 includes the pointer. In response, the memory controller 302 does not scan table 308 and instead uses the embedded pointer directly to access the page from the second region 222 of near memory 303.

By using table 308 only for pages pinned in the pinning region 221 while using pointers for pages pinned in the second region 222, the size of table 308 is kept limited or otherwise efficiently implemented. Here, the size of near memory 303 may be quite large. If pinning is permitted to spill from the pinning region 221 into the second region 222 the number of pages that are pinned in the second region 222 could be quite large. At the same time, the occurrence of having large numbers of pages pinned in the second region 222 could be quite infrequent. If table 308 were constructed to be large enough to keep track of all pinned pages in both the pinning and second regions 221, 222, table 308 might have to be very large. At the same time, it may be filled with entries only infrequently. Thus, in an embodiment, to economize the size of table 308, the burden of keeping track of pages pinned in the second region 222 is placed on the requestors and table 308 is only large enough to keep track of pages that are pinned in the pinning region 221.

In various embodiments, the pinning engine 305 is conscious of the size of the pinning region 221 and how many active pages are pinned in the pinning region. For instance, the pinning engine 305 may maintain a counter that increments every time a page is pinned in the pinning region 221 and decrements every time page is removed from the pinning region 221. When the pointer increments beyond a threshold that is equivalent to the number of memory page address slots within the pinning region 221, the pinning engine will recognize that pages will need to start being pinned in the second region 222.

In an embodiment, when a page is to be pinned in the pinning region 221, the pinning engine 305 simply assigns an address slot to it within the pinning region 221 and updates table 308. By contrast, when a page is to be pinned in the second region 222, the pinning engine 305 makes a request to a pinning manager 310 within a main memory control part 309 of the memory controller. The main memory control part 309 implements main memory control, or some portion thereof (e.g., front end logic of a near memory cache controller or multi-level memory controller). The pinning manager 310 sets up the pinning of the page within the second region 222. For example, if the second region 222 is also used as a memory side cache, the pinning manager 310 identifies a page in the cache to be evicted from the cache and, e.g., sent to far memory 304 to make room for the page to be pinned. Once the pinning manager 310 of the main memory control part 309 identifies a memory address slot within the second region 222 it informs the pinning engine 305 of the address and the pinning engine includes it in the response 2 to the requestor 301.

Additionally, whenever a page is to be pinned, regardless if it is pinned in the pinning region 221 or the second region 222, the memory controller 302 physically moves the memory page from its current location (e.g., in far memory 304) to the address slot in near memory that has been assigned for pinning (the physically moved instance of the page may be, e.g., a copy of the same page that still remains in far memory 304). In various embodiments, the response 2 to the request to pin the memory page is not sent to the requestor 301 until the physical movement of the memory page into its pinned location has been successfully completed.

With the requestor 301 keeping track of which pinned pages are kept in the second region 222, the pinning engine 305 has a limited understanding of the exact manner in which pinning has been accomplished outside the pinning region 221. As such, in an embodiment, the requestor 301 is tasked with recognizing the possibility of the fragmentation condition of FIG. 2d between available pinning region space 221 and existing pinned pages in the second region 222.

In an embodiment, the requestor 301 is therefore designed to recognize when its number of pages that are pinned in the pinning region 221 is below a number of allocated address slots the requester 301 has been assigned in the pinning region 221, and, the number of its pages that are pinned in the second region 222 exceeds some threshold. Upon recognition of this state, the requestor 301 will begin to send re-pin requests to the pinning engine 305 for those of its pages that are currently pinned in the second region 222.

Here, a requestor 301 may be allocated or otherwise guaranteed some number of address slots within the pinning region 221. This number of guaranteed slots may be established, e.g., by BIOS firmware, an operating system instance and/or a virtual machine monitor. Regardless of what/how such slots are allocated to the requestor 301, the requestor 301 understands how many address slots within the pinning region 221 it has been assigned/guaranteed for its own usage.

As described at length above the requestor 301 is free to request to pin more pages than its allocated number not only because of the option of pinning pages in the second region 222 but also because other requestors who have been allocated space in the pinning region 221 may not be currently using all of their allocated slots within the pinning region 221 and/or some percentage of the pinning region 221 may not have been allocated to any requestor. For these later reasons, it is possible in various embodiments for a requestor 301 to have more pages pinned in the pinning region 221 than the number of address slots it has been allocated in the pinning region 221.

Regardless, because of the structure of the table 306 in the requestor 301, the requestor 301 can immediately understand how many of its pinned pages are residing in the pinning region 221 and how many of its pinned pages are residing in the second region 222. As such, if the requestor 301 recognizes that the number of its pinned pages within the pinning region 221 is below the number of address slots it has been guaranteed in the pinning region 221 and the number of its pinned pages within the second region 222 is above some threshold number of pages, there exists a fairly strong hint that a fragmentation situation such as the situation of FIG. 2d currently exists in near memory 303.

Therefore in an embodiment, upon recognition of this state, the requestor 301 will begin to send one or more re-pin requests 1 to the pinning engine 305. The number of re-pin requests that are sent may be a function of the degree to which the condition for recognizing a fragmentation condition have been exceeded. A re-pin request 1 is essentially a request 1 to move a page that is currently pinned in the second region 222 to the pinning region 221. In an embodiment, a re-pin request 1 includes the address of a specific page that is currently pinned within the second region 222. The response 2 to a re-pin request 1, in an embodiment, indicates whether the request 1 was granted or not. If the request has been granted, the response 2 will simply indicate that the request has been granted (which may simply be an indication that the Overpin condition is now FALSE for the page's address). No pointer or indication of pinning in the second region is provided in the response 2 to reflect that the memory page is now pinned in the pinning region 221.

As such, the requestor 301 simply replaces the pointer and overpin values in the entry in table 306 for the page with null values to reflect that the page is now pinned in the pinning region 221. In an embodiment, before actually sending the response 2, the pinning engine 305 cause the memory controller 302 to physically move the page from the second region 222 to the pinning region 221 and updates table 308 to reflect the presence of the migrated page in the pinning region 221. In a further embodiment, the memory controller 302 includes logic to stall a pending memory access request for the page until after the page has been migrated, or, stall the migration of the page until all pending requests for the page have been serviced.

In an alternate approach to the requestor 301 initiating re-pinning, the pinning engine 305 may recognize the fragmentation state of FIG. 2d and initiate migration of pages pinned in the second region 222 to the pinning region 221. Here, the pinning engine 305 may keep counters that track how many pages are currently pinned in the pinning region 221 and how many pages are currently pinned in the second region 222. When the number of pages currently pinned in the pinning region 221 falls below some threshold beneath the total number of address slots in the pinning region 221, and, the number of pages currently pinned in the second region 222 exceeds some threshold, the pinning engine 305 may contact requestors for the addresses of their respective pages that are currently pinned in the second region 222.

In response the requestors return the respective pointer values of their pages that are pinned in the second region 222 and the pinning engine 305 thereafter begins migration of some or all of these pages from the second region 222 to the pinning region 221. Upon successful migration the requestors are sent notices of the migration that may simply identify the address of the migrated page and that its Overpin state is now FALSE. In response to such notice, a requestor will delete from its table 306 the pointer value for the page and the Overpin TRUE value for the page.

Although the embodiments described above have focused on implementations where the size of table 308 is kept economized by having the requestors keep track of where pages are pinned in the second region 222, in other embodiments, the economization of the size of table 308 may not be an issue and all pinning address mapping information is kept in table 308 for pages pinned in the pinning region 221 and the second region 222 alike.

In this implementation, the requestor 301 need not include pointers for pages that are pinned in the second region 222. Additionally, the pinning engine 305 is not only able to recognize a fragmentation condition, but is also able to resolve the fragmentation condition by migrating pages completely transparently to the requestor 301 (that is, the requestor has no idea that the pages are being migrated). In this approach the requestor 301 need not include pointer information nor Overpin information for any of its pinned pages and may only track whether each pinning request it has sent for one or more pages has been granted or not.

At the other extreme, the function of the pinning engine 305 is distributed across the requestors. Here, each of the requestors maintain the mapping information of table 308 for their respective pages. If a requestor seeks to pin a memory page beyond its allocated pinning region space it sends requests to the other requestors to use their allocated pinning region space. A requestor who has available allocated pinning region space may grant the requestor's request and lend it its pinning region space (by providing the space's address). If no such pinning region space is granted the requestor can request the memory controller to pin the page in the second region. The memory controller may respond affirmatively by providing the requestor with a pointer to the memory page which the requestor subsequently uses when accessing the memory page. Any requestor can detect a hint of fragmentation when it is has pinned pages in the second region and available allocated slots in the pinning region. In response to the hint the requestor can request the memory controller to re-pin its own pages. Additionally, requestors may regularly communicate amongst themselves to keep tabs on the number of pages pinned in the pinning region and the number of pages pinned in the second region and trigger re-pinning, e.g., as a coordinate group response, in response to a group recognized fragmentation condition.

Returning to a discussion of the approach where the requestor 301 keeps pointers for pages that are pinned in the second region 222, once a requestor 301 has determined that a page no longer needs to be pinned, the requestor 301 may send an un-pin request to the pinning engine 305 for the page. If the page is currently pinned in the pinning region 221, the un-pin request need only identify the address of the page and the un-pin opcode. If the page is currently pinned in the second region 222, the request to the pinning engine should further include the pointer to the page in the second region 222. In either case, the pinning engine 305 will cause the pinned page to be evicted from its current pinned address slot in near memory 303. In the case where the page is evicted from the pinning region 221, the pinning engine 305 updates table 308 to eliminate the mapping entry for that page. In the case where the page is evicted from an address slot within the second region 222, the memory controller 302 may additionally perform tasks to cause the slot to be used again for its second purpose (e.g., as a memory side cache).

Although the above discussions have largely referred to one requestor 301 for illustrative ease, it is pertinent to point out that multiple requestors can operate concurrently with one another according to the processors described above. That is, the pinning engine 305 can concurrently support multiple requestors.

Note that, as mentioned above, the requestor can be implemented with software (e.g., an application, an operating system (OS) instance, a virtual machine monitor, firmware), hardware (e.g., logic circuitry disposed on a semiconductor chip that makes specific invocations to memory such as a graphics processor unit (GPU), an I/O control hub, etc.) or a combination of the two. Likewise, the pinning engine and/or the memory controller can be implemented with logic circuitry (e.g., dedicated logic circuitry and/or programmable logic circuitry (such as a programmable logic device (PLD) or field programmable gate array (FPGA)) and may even implement various functions as embedded program code (e.g., as BIOS firmware or other firmware) that is executed within the memory controller (e.g., by an embedded controller).

Figure 4:
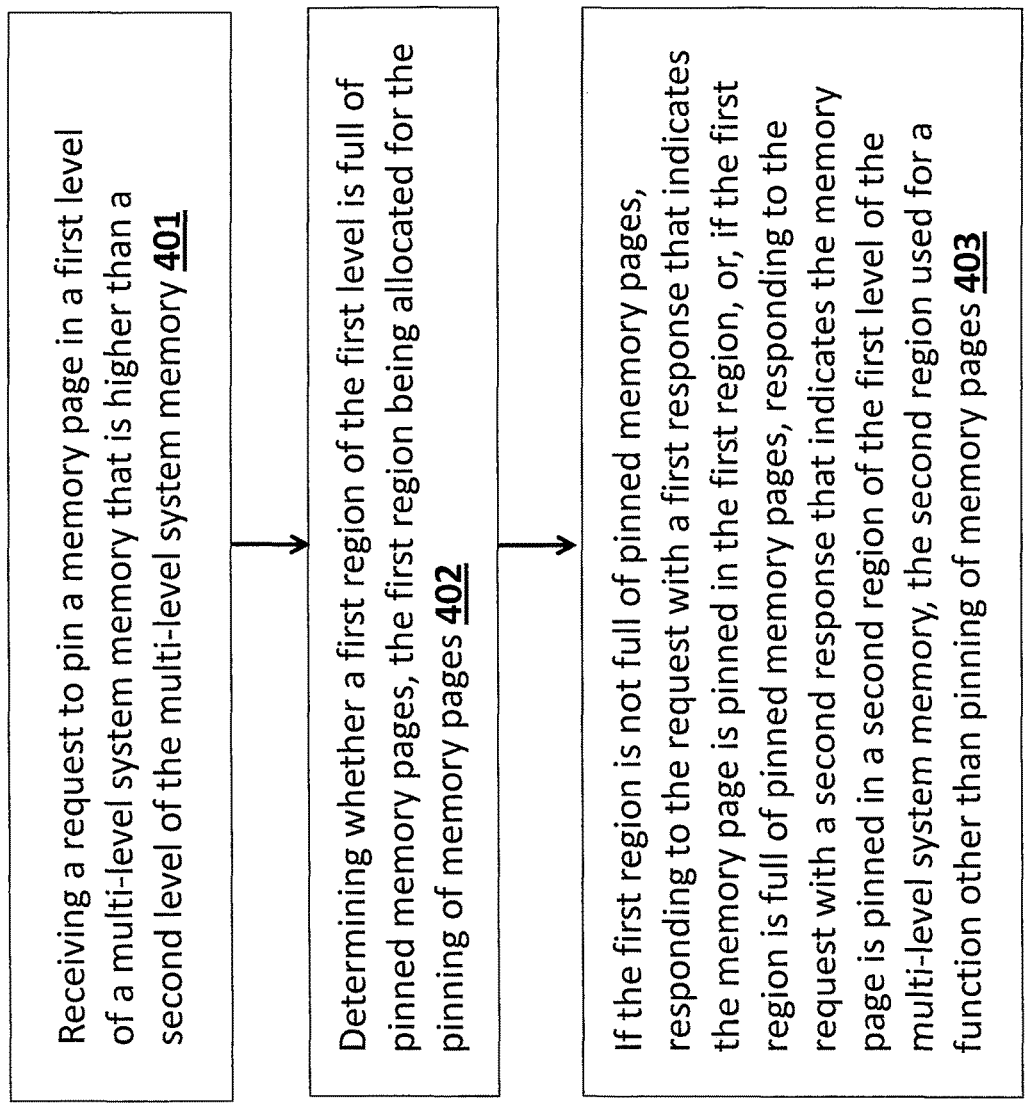
FIG. 4 shows a methodology performed by the pinning engine of FIG. 3.

FIG. 4 shows a methodology performed by the pinning engine as described above. As observed in FIG. 4 the method includes receiving a request to pin a memory page in a first level of a multi-level system memory that is higher than a second level of the multi-level system memory 401. The method also includes determining whether a first region of the first level is full of pinned memory pages, where, the first region is allocated for the pinning of memory pages 402. The method also includes, if the first region is not full of pinned memory pages, responding to the request with a first response that indicates the memory page is pinned in the first region, or, if the first region is full of pinned memory pages, responding to the request with a second response that indicates the memory page is pinned in a second region of the first level of the multi-level system memory, wherein the second region is used for a function other than the pinning of memory pages 403.

Figure 5:
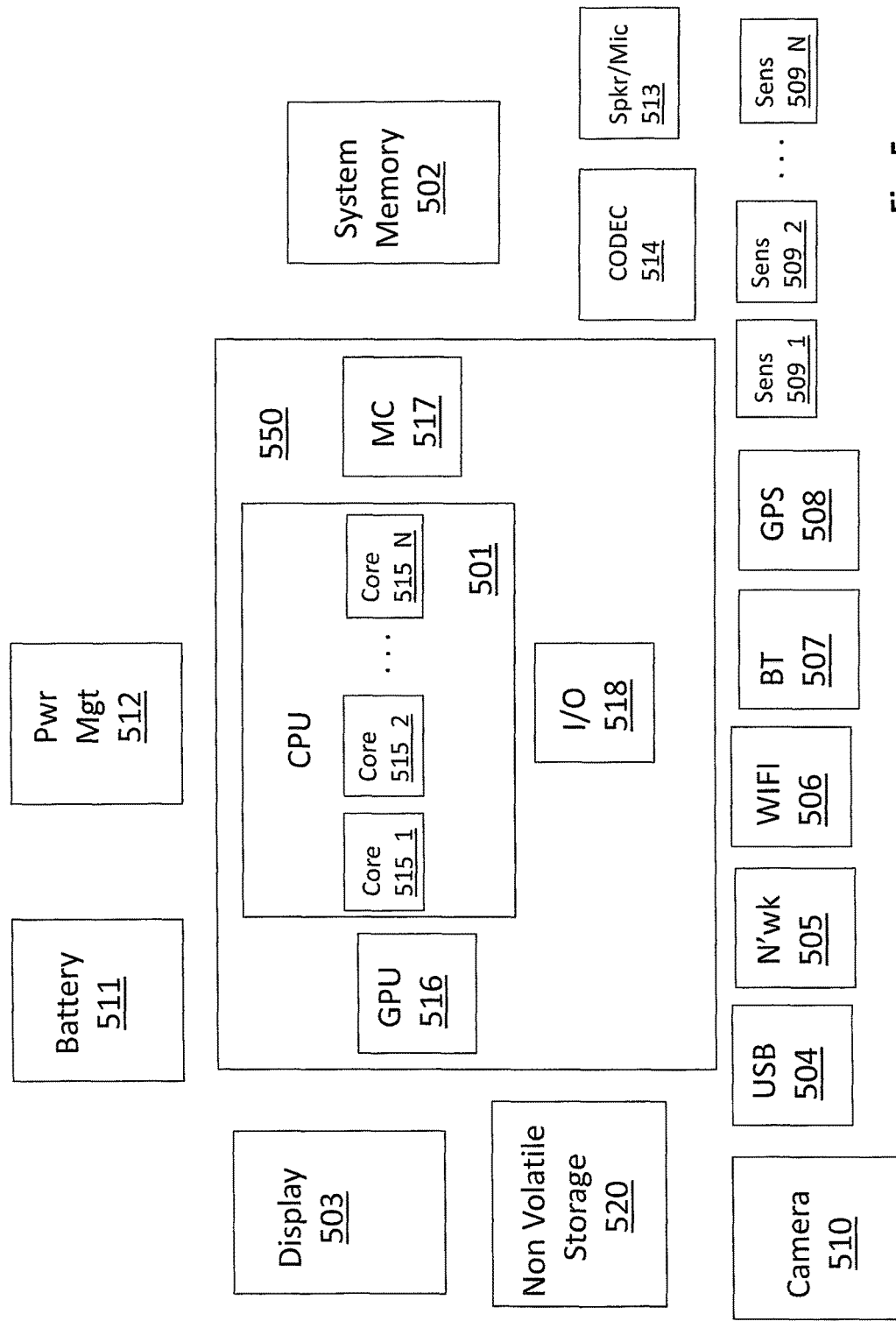
FIG. 5 shows an embodiment of a computing system.

FIG. 5 shows a depiction of an exemplary computing system 500 such as a personal computing system (e.g., desktop or laptop) or a mobile or handheld computing system such as a tablet device or smartphone, or, a larger computing system such as a server computing system. As observed in FIG. 5, the basic computing system may include a central processing unit 501 (which may include, e.g., a plurality of general purpose processing cores and a main memory controller disposed on an applications processor or multi-core processor), system memory 502, a display 503 (e.g., touchscreen, flat-panel), a local wired point-to-point link (e.g., USB) interface 04, various network I/O functions 505 (such as an Ethernet interface and/or cellular modem subsystem), a wireless local area network (e.g., WiFi) interface 506, a wireless point-to-point link (e.g., Bluetooth) interface 507 and a Global Positioning System interface 508, various sensors 509_1 through 509_N (e.g., one or more of a gyroscope, an accelerometer, a magnetometer, a temperature sensor, a pressure sensor, a humidity sensor, etc.), a camera 510, a battery 511, a power management control unit 512, a speaker and microphone 513 and an audio coder/decoder 514.

An applications processor or multi-core processor 550 may include one or more general purpose processing cores 515 within its CPU 501, one or more graphical processing units 516, a memory management function 517 (e.g., a memory controller) and an I/O control function 518. The general purpose processing cores 515 typically execute the operating system and application software of the computing system. The graphics processing units 516 typically execute graphics intensive functions to, e.g., generate graphics information that is presented on the display 503. The memory control function 517 interfaces with the system memory 502. The system memory 502 may be a multi-level system memory such as the multi-level system memory discussed at length above. The memory controller may include a pinning engine as described above. During operation, data and/or instructions are typically transferred between deeper non volatile (e.g., disk) storage 520 and system memory 502. The power management control unit 512 generally controls the power consumption of the system 500.

Each of the touchscreen display 503, the communication interfaces 504-507, the GPS interface 508, the sensors 509, the camera 510, and the speaker/microphone codec 513, 514 all can be viewed as various forms of I/O (input and/or output) relative to the overall computing system including, where appropriate, an integrated peripheral device as well (e.g., the camera 510). Depending on implementation, various ones of these I/O components may be integrated on the applications processor/multi-core processor 550 or may be located off the die or outside the package of the applications processor/multi-core processor 550.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a memory controller to interface with a multi-level system memory, said memory controller comprising a pinning engine to pin a memory page into a first level of said multi-level system memory, said first level a higher level of said multi-level system memory than a second level of said multi-level system memory, said memory controller to write to and read from said first and second levels of said multi-level system memory at cache line granularity, wherein said first level is partitionable into a first region allocated for pinned memory pages and a second region allocated for at least one of a cache and a higher priority region of system memory address space than system memory address space allocated to said second level, and wherein, said pinning engine is to pin the memory page in the first region if space exists in the first region for the memory page or in the alternative pin the memory page in the second region.

2. The apparatus of claim 1 wherein said pinning engine is coupled to a mapping table, said mapping table to keep mappings of system memory addresses of pinned pages to addresses of said first region where said pinned pages are pinned.

3. The apparatus of claim 1 wherein said pinning engine is to send a response to a request from a requestor to pin the memory page, said response to include an indication whether said memory page is pinned in said first region or said second region.

4. The apparatus of claim 3 wherein said response includes a pointer to said memory page if said memory page is pinned in said second region.

5. The apparatus of claim 1 wherein said pinning engine is to receive a request from a requestor to re-pin a memory page that is pinned in said second region from said second region to said first region.

6. The apparatus of claim 5 wherein said requestor includes a table, said table to identify those of said requestor's memory pages that are pinned in said first region and those of said requestor's memory pages that are pinned in said second region.

7. The apparatus of claim 6 wherein said requestor is to identify when said first region has openings that are fillable with memory pages pinned in said second region.

8. The apparatus of claim 1 wherein said memory controller is to migrate a memory page pinned in said second region to an opening in said first region.

9. The apparatus of claim 8 wherein said pinning engine is to initiate migration of memory pages pinned in said second region to openings in said first region based on an understanding of openings in said first region and pinned pages in said second region.

10. A method, comprising:
receiving a request from a requestor to pin a memory page in a first level of a multi-level system memory that is higher than a second level of said multi-level system memory;

determining whether a first region of said first level is full of pinned memory pages, said first region being allocated for the pinning of memory pages;

if said first region has sufficient space for the memory page, responding to the requestor with a first response that indicates the memory page is pinned in the first region, or, if said first region does not have sufficient space for the memory page, responding to the requestor with a second response that indicates the memory page is pinned in a second region of said first level of said multi-level system memory, said second region including at least one of a cache and higher priority system memory address space than said second level; and, writing to and reading from said first and second levels of said multi-level system memory at cache line granularity.

11. The method of claim 10 wherein said method further includes providing a pointer to said memory page in said second response.

12. The method of claim 11 further comprising a requestor that sent the request and received the second response performing the following:

updating a table with an entry for the memory page that includes the pointer and an indication that the memory page is kept in the second region.

13. The method of claim 10 further comprising migrating a pinned memory page from said second region to an opening in said first region.

14. A computing system, comprising:

a multi-level system memory, said multi-level system memory comprising a first level that is at a higher level than a second level of said multi-level system memory; and a memory controller to interface with said multi-level system memory, said memory controller to write to and read from said first and second levels of said multi-level system memory at cache line granularity, said memory controller comprising a pinning engine to pin a memory page into said first level of said multi-level system memory, said first level being partitionable into a pinning region and a caching and/or higher priority system memory region than said second level of said multi-level system memory, said pinning engine to pin a memory page into said caching and/or higher priority system memory region if said pinning region does not have sufficient space for said memory page.

15. The computing system of claim 14 wherein said pinning engine is further to migrate a pinned memory page from said caching and/or higher priority system memory region into an opening in said pinning region.

16. The computing system of claim 14 further comprising a requestor, said requestor having a table to keep track of said requestor's pinned memory pages, said table to indicate which of said requestor's pinned memory pages are pinned in said caching and/or higher priority system memory region.

17. The computing system of claim 16 wherein said requestor is to recognize when there exist openings in said pinning region and there exist pages pinned in said caching and/or higher priority system memory region.

18. The computing system of claim 17 wherein said requestor is to request a re-pin of one or more of the pages pinned in said caching and/or higher priority system memory region in response to the recognition.

19. The computing system of claim 17 comprising:

at least one processor communicatively coupled to the memory controller and a network interface communicatively coupled to the at least one processor.

20. The computing system of claim 19 comprising:

a display communicatively coupled to the at least one process.

* * * * *